US012797902B2

(12) United States Patent
Janko et al.

(10) Patent No.: US 12,797,902 B2
(45) Date of Patent: Nov. 17, 2026

(54) PIECEWISE CHARACTERIZATION OF ELECTROMECHANICAL ACTUATOR

(71) Applicant: Cirrus Logic International Semiconductor Ltd., Edinburgh (GB)

(72) Inventors: Marco Janko, Austin, TX (US); Jorge Reynaga, Austin, TX (US); Chin Yong, Austin, TX (US); Eric Lindemann, Boulder, CO (US); Emmanuel Marchais, Dripping Springs, TX (US); Hamid Sepehr, London (GB); Vadim Konradi, Austin, TX (US); Michael Kurek, Austin, TX (US); Filippo Rossi, London (GB); Anil Lal, Isleworth (GB); Aleksey Khenkin, Lago Vista, TX (US)

(73) Assignee: Cirrus Logic, Inc., Austin, TX (US)

( * ) Notice: Subject to any disclaimer, the term of this patent is extended or adjusted under 35 U.S.C. 154(b) by 773 days.

(21) Appl. No.: 18/098,396

(22) Filed: Jan. 18, 2023

(65) Prior Publication Data

US 2024/0238842 A1 Jul. 18, 2024

(51) Int. Cl.
*B06B 1/02* (2006.01)
*H04R 29/00* (2006.01)

(52) U.S. Cl.
CPC ........... *B06B 1/0276* (2013.01); *H04R 29/00* (2013.01); *B06B 2201/40* (2013.01)

(58) Field of Classification Search
CPC ..... B06B 1/0276; B06B 1/045; B06B 1/0215; B06B 2201/40; H04R 29/00; H04R 29/003; G01R 31/2829; G01R 35/005
See application file for complete search history.

(56) References Cited

U.S. PATENT DOCUMENTS 4,284,860 A 8/1981 Leach, Jr. et al.
10,726,683 B1 7/2020 Marchais et al.
(Continued)

FOREIGN PATENT DOCUMENTS

CN 111034223 A 4/2020
CN 114624586 A 6/2022
(Continued)

OTHER PUBLICATIONS

Ealo, Joao L. et al. "Broadband EMFi-Based Transducers for Ultrasonic Air Applications." *IEEE Transactions on Ultrasonics, Ferroelectrics, and Frequency Control*, vol. 55, No. 4. Apr. 2008. pp. 919-929.

*Primary Examiner* — Stephen D Meier
*Assistant Examiner* — Quang X Nguyen
(74) *Attorney, Agent, or Firm* — E. Alan Davis; Huffman Law Group, PC

(57) ABSTRACT

A method includes applying a high frequency signal to an electromechanical actuator and measuring a first response of the electromechanical actuator to the high frequency signal, estimating electrical parameters of the electromechanical actuator based on the first response, applying a low frequency broadband signal to the electromechanical actuator and measuring a second response of the electromechanical actuator to the low frequency broadband signal, and estimating mechanical parameters of the electromechanical actuator based on the second response and the estimated electrical parameters.

44 Claims, 6 Drawing Sheets

First step: apply high frequency tone excitation signal, measure coil response, use coil response and excitation signal to estimate Re and Le.

Second step: apply low frequency broadband excitation signal (band around tank resonant frequency), measure tank response, use estimated Re and Le to estimate Vbemf, use tank response and estimated Vbemf to estimate Res, Lces, and Cmes.

(56) References Cited

U.S. PATENT DOCUMENTS

| | | | | |
|---|---|---|---|---|
| 11,263,877 | B2 | 3/2022 | Marchais et al. | |
| 2017/0105068 | A1* | 4/2017 | Lesso | H03G 3/3005 |
| 2017/0318390 | A1 | 11/2017 | Bjork et al. | |
| 2020/0313654 | A1 | 10/2020 | Marchais et al. | |
| 2021/0174777 | A1* | 6/2021 | Marchais | G10K 9/13 |

FOREIGN PATENT DOCUMENTS

| | | | |
|---|---|---|---|
| CN | 114726339 | A | 7/2022 |
| JP | 6089168 | B2 | 3/2017 |
| TW | 201320593 | A1 | 5/2013 |
| TW | 201414174 | A | 4/2014 |
| TW | 201720043 | A | 6/2017 |

* cited by examiner

100

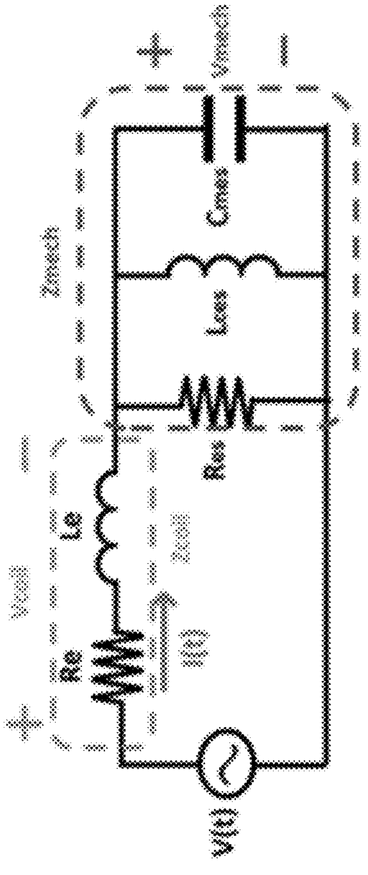

*FIG. 1*

First step: apply high frequency tone excitation signal, measure coil response, use coil response and excitation signal to estimate Re and Le.

Second step: apply low frequency broadband excitation signal (band around tank resonant frequency), measure tank response, use estimated Re and Le to estimate Vbemf, use tank response and estimated Vbemf to estimate Res, Lces, and Cmes.

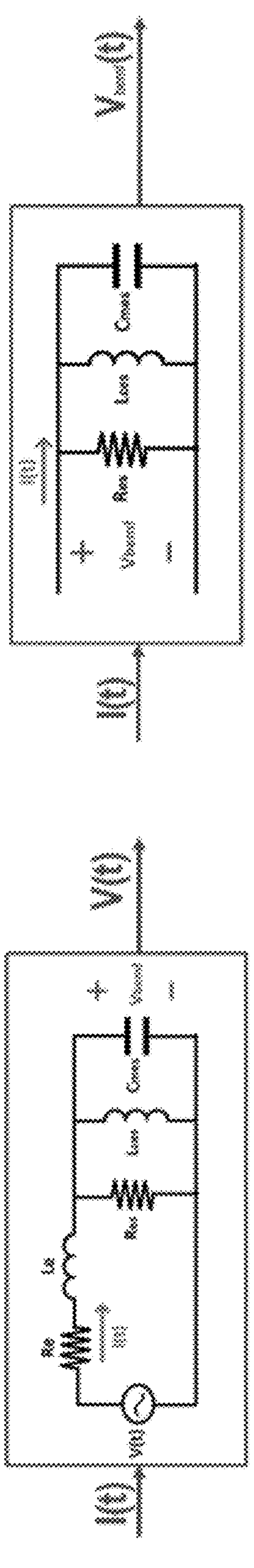

*FIG. 2*

PIECEWISE CHARACTERIZATION OF ELECTROMECHANICAL ACTUATOR

BACKGROUND

Electromechanical actuators commonly require calibration, which involves characterizing the actuator by stimulating the actuator. Characterizing the actuator involves determining parameters of the actuator. One known method of stimulating an electromechanical actuator in order to characterize it is using a chirp signal. A chirp signal is a sinusoidal signal that increases or decreases in frequency over time in order to sweep over many different frequencies. However, a drawback of using a chirp signal to characterize an electromechanical actuator is that the amount of time required to obtain accurate results is relatively long, which may be undesirable in some contexts, such as during manufacture of a large number of devices that include the electromechanical actuator that needs to be calibrated. Another drawback of using a chirp signal to characterize an electromechanical actuator is that the chirp signal is perceivable. Yet another drawback of using a chirp signal to characterize an electromechanical actuator is that the chirp signal, if applied sufficiently long, may induce thermal effects, e.g., heating.

Another known method of stimulating an electromechanical actuator in order to characterize it is using a short duration high amplitude impulse to measure the impulse response. However, a drawback of using an impulse to characterize an electromechanical actuator is that the impulse may be destructive to the electromechanical actuator. Furthermore, there are contexts in which it is not practically feasible to use an impulse to characterize an electromechanical actuator.

Generally speaking, it is desirable to have a method for characterizing an electromechanical actuator that is fast, accurate, repeatable, and imperceptible.

SUMMARY

In one embodiment, the present disclosure provides a method that includes applying a high frequency signal to an electromechanical actuator and measuring a first response of the electromechanical actuator to the high frequency signal, estimating electrical parameters of the electromechanical actuator based on the first response, applying a low frequency broadband signal to the electromechanical actuator and measuring a second response of the electromechanical actuator to the low frequency broadband signal, and estimating mechanical parameters of the electromechanical actuator based on the second response and the estimated electrical parameters.

In another embodiment, the present disclosure provides a non-transitory computer-readable storage medium having computer program instructions stored thereon to implement a method that includes applying a high frequency signal to an electromechanical actuator and measuring a first response of the electromechanical actuator to the high frequency signal, estimating electrical parameters of the electromechanical actuator based on the first response, applying a low frequency broadband signal to the electromechanical actuator and measuring a second response of the electromechanical actuator to the low frequency broadband signal, and estimating mechanical parameters of the electromechanical actuator based on the second response and the estimated electrical parameters.

BRIEF DESCRIPTION OF THE DRAWINGS

FIG. 1 is an example circuit diagram characterization of an electromechanical actuator electrical impedance whose parameters may be estimated in a piecewise manner in accordance with embodiments of the present disclosure.

FIG. 2 is an example diagram illustrating a process for performing piecewise estimation of the parameters of an electromechanical actuator such as the electromechanical actuator of FIG. 1 in accordance with embodiments of the present disclosure.

DETAILED DESCRIPTION

Figure 3:
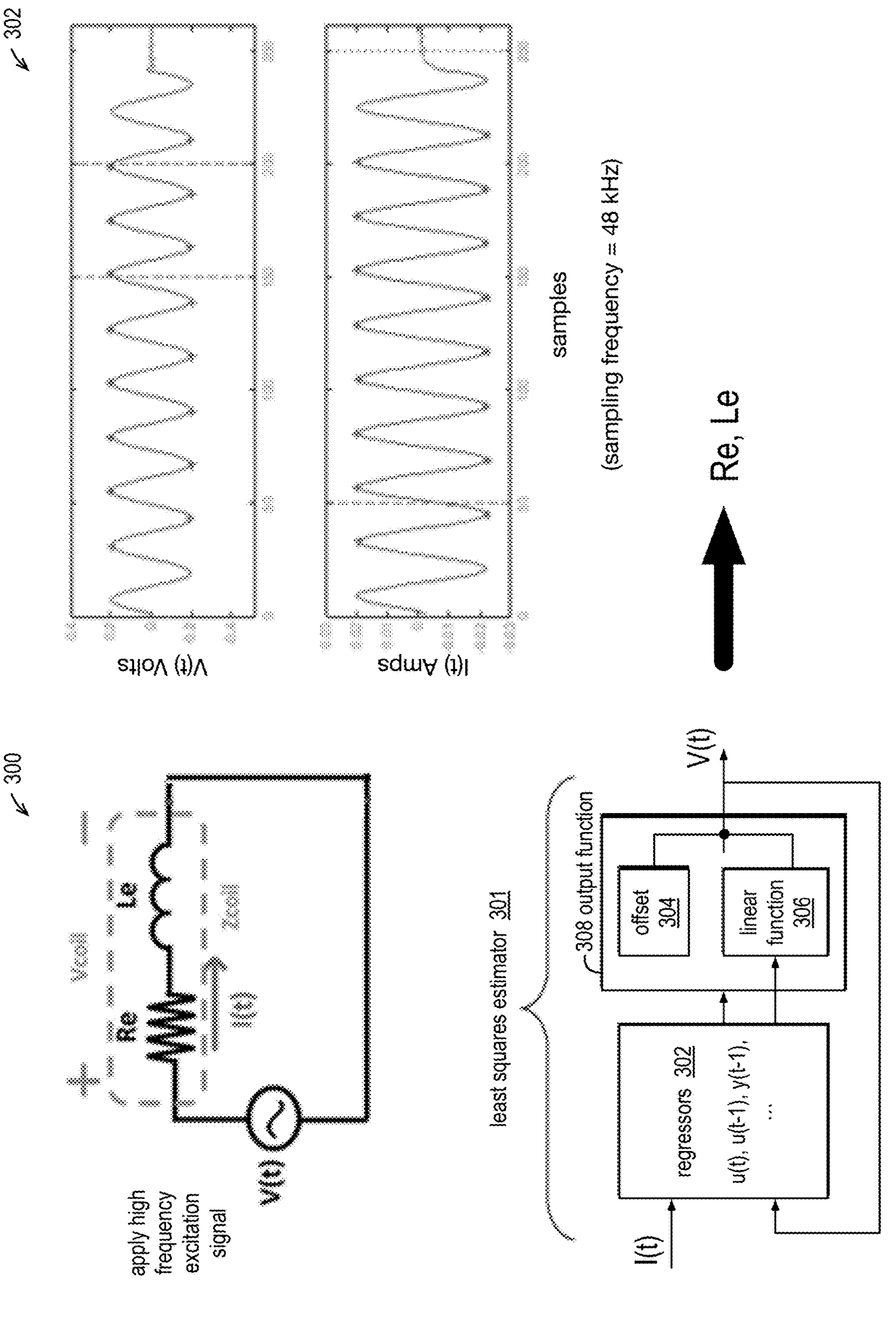
FIG. 3 is an example diagram illustrating the first step of the piecewise electromechanical actuator characterization process in accordance with embodiments of the present disclosure.

FIG. 1 is an example circuit diagram characterization of an electromechanical actuator 100 electrical impedance whose parameters may be estimated in a piecewise manner in accordance with embodiments of the present disclosure. The electromechanical actuator 100 may be a voice coil motor, a linear resonant actuator (LRA), an ultrasonic acoustic output transducer, a haptic transducer of a vibro-haptic system, a speaker, or other type of electromechanical actuator. In FIG. 1, the electromechanical actuator 100 is depicted as having a mechanical portion (also referred to as the tank) and a coil portion. Embodiments are described in which, in a piecewise fashion, the parameters of the coil may be estimated first, and then the parameters of the tank may be subsequently estimated using the estimated parameters of the tank. The electromechanical actuator parameters may be commonly referred to as Thiele/Small (TS) parameters. The electromechanical actuator 100 may be included for use in a device such as a mobile phone or other device.

The coil of the electromechanical actuator 100 is characterized as having in series a resistive parameter (Re), also referred to as the DC resistance, and an inductive parameter (Le), also referred to as the electrical coil inductance, which are electrical parameters of the electromechanical actuator 100. The resultant impedance of Re and Le in series is referred to in FIG. 1 as Zcoil. The tank of the electromechanical actuator 100 may be modeled as a spring system having a moving mass. The tank is characterized as having in parallel a resistance at resonance parameter (Res), an inductance parameter (Lces) representative of a compliance of the spring system, and a capacitance parameter (Cmes) representative of the moving mass of the spring system, which are mechanical parameters of the electromechanical actuator 100. The mechanical parameters of the electromechanical actuator 100 may also be referred to as resonant parameters. The resultant impedance of Res, Lces, and Cmes in parallel is referred to in FIG. 1 as Zmech. Zmech may equivalently be represented by the mechanical parameters Res, resonant frequency (F0), and quality factor (Q). Res, Lces, and Cmes may be understood as electrical analog parameters of the mechanical parameters Res, F0, and Q, which are related by equations (1) through (3).

$$Q = Res\left(\frac{Cmes}{Lces}\right)^{\frac{1}{2}} \tag{1}$$

$$F0 = \frac{1}{2\pi\sqrt{Cmes * Lces}} \tag{2}$$

$$Res = Lces * 2\pi * F0 * Q \tag{3}$$

As shown in FIG. 1, an excitation voltage V(t) is applied to the electromechanical actuator 100. The application of the excitation voltage V(t) induces a current I(t) that passes through Re and Le in series (Zcoil), and then passes through Res, Lees, and Cmes in parallel (Zmech). More specifically, current I(t) passes through impedance Zcoil which generates a voltage Vcoil across the coil, and current I(t) passes through impedance Zmech which generates a voltage Vmech across the tank, as shown. The voltage Vmech may also be referred to as back emf voltage Vbemf.

As described in more detail below, the excitation voltage V(t) includes two components—a high frequency (HF) tone and a low frequency (LF) broadband signal—that are designed to elicit respective electrical and mechanical responses from the electromechanical actuator 100 that may be used as respective bases to estimate the respective electrical parameters and the mechanical parameters of the electromechanical actuator 100 in that order. That is, in a piecewise fashion, the electrical parameters are estimated first and then used to estimate the mechanical parameters. As described below, the HF and LF broadband components may be applied concurrently to the electromechanical actuator 100, or they may be applied separately in time in either order. Although FIG. 1 shows forcing a voltage into the electromechanical actuator 100 that induces a measured current, both of which are used to estimate the parameters of the electromechanical actuator 100, other embodiments are contemplated in which a current is forced into the electromechanical actuator 100 that generates a measured voltage, both of which are used to estimate the parameters of the electromechanical actuator 100. A system and method for performing piecewise estimation of the electrical and mechanical parameters of the electromechanical actuator 100 will now be described broadly with respect to FIG. 2.

FIG. 2 is an example diagram illustrating a process for performing piecewise estimation of the parameters of an electromechanical actuator such as the electromechanical actuator 100 of FIG. 1 in accordance with embodiments of the present disclosure. Generally, the electrical parameters of the coil are estimated first in time as shown in the left portion of FIG. 2, and then the estimated electrical parameters are used to estimate the mechanical parameters of the tank as shown in the right portion of FIG. 2. The excitation voltage V(t) is applied to the electromechanical actuator, and the electromechanical actuator responds in the form of a measurable current I(t). More specifically, the excitation voltage V(t) applied to excite the electrical response from the coil is a short HF tone, and the excitation voltage V(t) applied to excite a resonant response from the tank (a broadband response) is a short LF broadband signal (also referred to as a resonant excitation signal), each of which is described in more detail below.

The coil current I(t) response to the HF tone excitation signal V(t) is measured and used, along with the excitation signal V(t), as a basis for characterizing the coil according to the first step. That is, the electrical parameters Re and Le of the coil are estimated (e.g., using least squares estimation) as described in more detail below with respect to FIGS. 3 and 4 based on equation (4) below, in which j is the imaginary number square root of −1, and ω is the angular frequency of the HF tone, the angular frequency value being much greater than 2π*F0; and V(t) and I(t) are complex-valued samples of the excitation signal and response, respectively.

$$V(t) = I(t) * (Re + j\omega Le) \tag{4}$$

The tank current I(t) response to the LF broadband excitation signal V(t) is measured and used, along with the excitation voltage V(t) and the estimated Re and Le values, to then compute the back emf voltage Vbemf (or Vmech) according to equation (5).

$$V_{bemf}(t) = V(t) - Re * I(t) - Le * d\frac{I(t)}{dt} \tag{5}$$

Then, the measured tank current I(t) response and the calculated back emf voltage Vbemf(t) are used as a basis for characterizing the tank according to the second step. That is, the mechanical parameters Res, Lces, Cmes of the tank are estimated (e.g., using least squares estimation) as described in more detail below with respect to FIGS. 5 through 7 based on equation (6), in which s is the Laplace transform variable.

$$V_{bemf}(s) = I(s) * \frac{s\frac{1}{Cmes}}{s^2 + s\frac{1}{Res * Cmes} + \frac{1}{Cmes * Lces}} \tag{6}$$

Once the electrical and mechanical parameters are estimated, a model of the electromechanical actuator may be built, and the electromechanical actuator may be calibrated. The knowledge of the electromechanical actuator parameters may be used by the device that includes the electromechanical actuator to adapt and optimize the signals played back to the electromechanical actuator.

The piecewise nature of the parameter estimation—with separate excitation signals targeted at the coil and tank—advantageously enables the HF excitation signal and the LF broadband excitation signal to be relatively short in duration, which may facilitate faster characterization and calibration of the electromechanical actuator than previous methods. The shorter characterization time may be advantageous during the manufacture of a device (e.g., mobile phone) that incorporates the electromechanical actuator (e.g., a haptic transducer of a vibro-haptic system), particularly if large numbers of the device are being manufactured. Additionally, the short characterization time may make the playback of the excitation signals effectively imperceptible and therefore advantageously permit the electromechanical actuator to be characterized and calibrated on demand, e.g., during operation of the device by the consumer of the device, and not only at production time. The ability to characterize and calibrate on demand may be particularly valuable since the parameters of the electromechanical actuator may vary over time after the device is manufactured, e.g., based on use, temperature, aging, and other factors. Further advantageously, the piecewise manner of estimating two parameters (Re and Le) first, then subsequently estimating the other three parameters (Res, Lces, and Cmes) may be more stable than estimating five parameters at the same time. Stated alternatively, the piecewise manner of estimating the electrical parameters first, then subsequently estimating the mechanical parameters may reduce the complexity of the problem of characterizing the electromechanical actuator.

Although the embodiments estimate the electrical parameters first, then use the estimated electrical parameters to estimate the mechanical parameters, the HF excitation signal and the LF broadband signal may be applied in either order. Furthermore, in an embodiment, the HF excitation signal and the LF broadband excitation signal may be applied concurrently, as long as there is a sufficient gap between the HF and LF broadband signals such that they do not produce harmonics that interfere with one another. In other words, the calculation/estimation of the parameters—in a piecewise manner—is a distinct operation from the application of the HF and the LF broadband excitation signals. More specifically, although the electrical parameters are estimated first, and the estimated electrical parameters are then used to estimate the mechanical parameters, the HF excitation signal need not be applied in time before the application of the LF broadband excitation signal but may instead be played concurrently therewith or thereafter.

FIG. 3 is an example diagram illustrating the first step of the piecewise electromechanical actuator characterization process in accordance with embodiments of the present disclosure. FIG. 3 includes a circuit diagram 300 illustrating the application of the HF excitation signal V(t) to the coil of the electromechanical actuator 100 of FIG. 1 to elicit a response in the form of current I(t), an estimator 301, and examples waveforms of V(t) and I(t). In an embodiment, the HF excitation signal V(t) is a pilot tone burst at 2 kHz, although other embodiments are contemplated having a tone burst at other frequencies sufficiently separated from the frequency band of the LF broadband excitation signal used in the second step of the piecewise characterization process described in more detail below. In the example of FIG. 3, approximately 240 data samples of V(t) and I(t) are collected at 48 kHz for approximately 5 milliseconds, which has been empirically determined to be sufficient for a tested sample of electromechanical actuators to produce precise results. The least squares estimator 301 estimates Re and Le using the HF excitation signal V(t) and the response current I(t).

The least squares estimator 301 includes regressors 302 and an output function 308 that outputs the voltage V(t). The output function 308 includes an offset 304 and a linear function block 306. The offset 304 may correspond to an offset of a current monitor that measures the current I(t) (e.g., using a known-value sense resistor and analog-to-digital converter that converts the voltage measured across the resistor) that requires mitigation in order to estimate Re and Le more accurately. The regressors 302 receive the current I(t) and the fed back voltage V(t) as inputs. The output of the regressors 302 is provided as an input to the linear function block 306. The offset 304 is subtracted from the output of the linear function block 306 to produce the voltage V(t). In an embodiment, the estimator 301 uses a well-known least squares estimation method to estimate Re and Le using the voltage V(t) and current I(t) according to equation (4) above using the collected data samples. Although an embodiment has been described that employs least squares estimation to estimate Re and Le, they may be estimated by other well-known estimation methods including, but not limited to, least means square (LMS) estimation or other iterative methods, as well as adaptive filtering. Furthermore, the HF excitation signal V(t) includes minimal offset in order to foster accurate estimation of Re and Le.

As will be more clearly understood from the description below of the second step of the piecewise characterization, accurate estimation of the mechanical parameters by the second step may require accurate estimation of the electrical parameters by the first step. This is in contrast, for example, to previous methods such as the method for identifying mechanical impedance described in U.S. Pat. No. 10,726,683 and 11,263,877, each of which is incorporated by reference herein in its entirety for all purposes. In these patents, a back emf voltage is estimated at two different tone frequencies, and the difference of the back emf voltage (amplitude and phase) is calculated. In such an approach: "The estimates of DC resistance Re and inductance Le may not need to be accurate (e.g., within an approximate 10% error may be acceptable), and thus, fixed values from an offline calibration or from a data sheet specification may be sufficient." The acceptability in the patented method of the Re and Le error is due to the fact that the error in the voltage estimate caused by error in Re and Le will essentially be removed by the taking of the difference. In contrast, as described below, the second step of embodiments of the present disclosure uses the estimated back emf voltage (Vbemf) directly (i.e., not by taking a difference) to estimate the mechanical parameters. Thus, the current monitor offset mitigation may significantly improve the accuracy of the characterization of the electromechanical actuator. Additionally, compensation for shift of a real portion of Zcoil, described below with respect to FIG. 4, may also be employed to improve the accuracy of the characterization of the electromechanical actuator.

Figure 4:
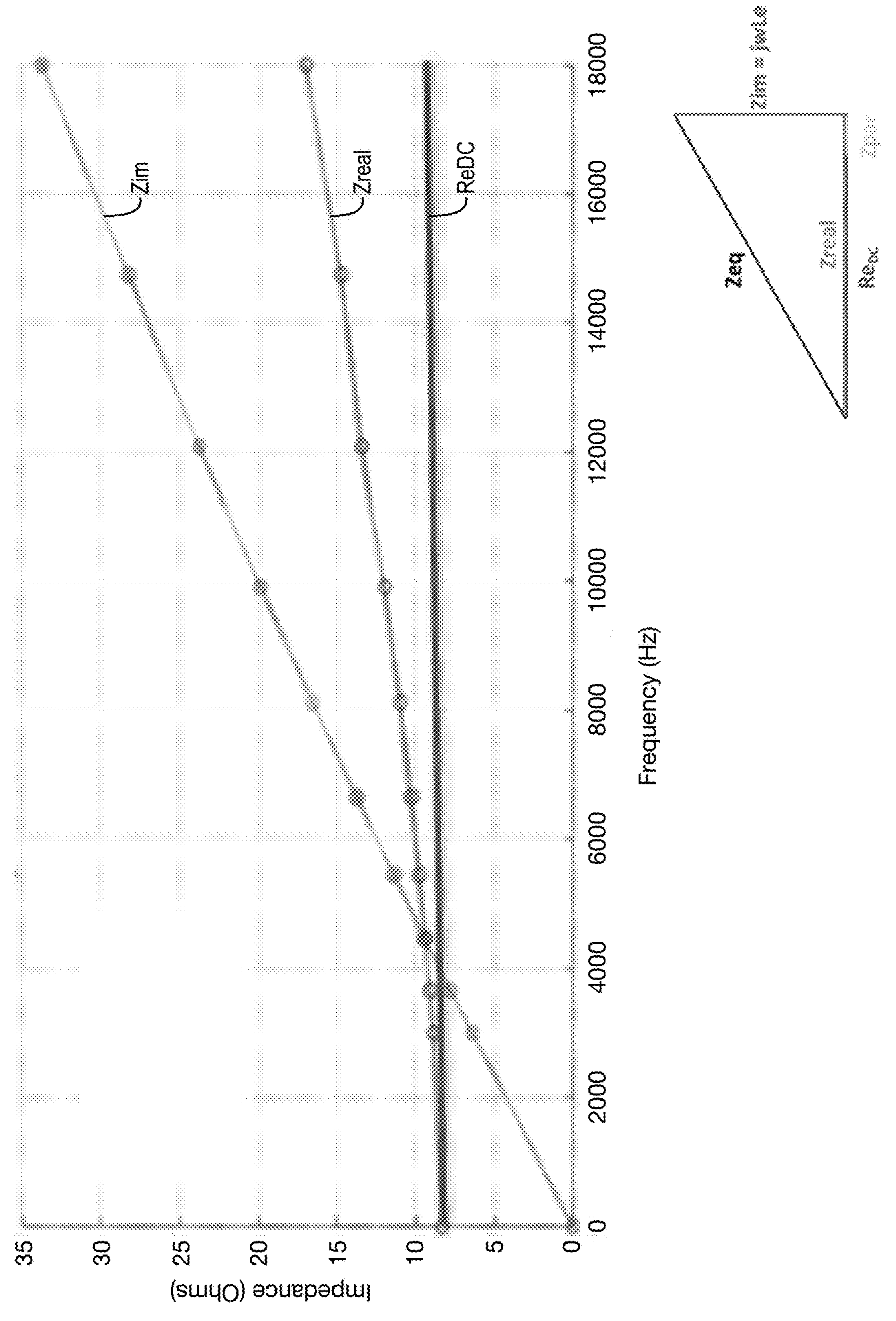
FIG. 4 is an example diagram illustrating high frequency compensation for low frequency estimation employed in the first step of the piecewise electromechanical actuator characterization process in accordance with embodiments of the present disclosure.

FIG. 4 is an example diagram illustrating high frequency compensation for low frequency estimation employed in the first step of the piecewise electromechanical actuator characterization process in accordance with embodiments of the present disclosure. FIG. 4 includes a graph illustrating measured fluctuations of the DC coil resistance Re (referred to in FIG. 4 as ReDC) of the coil impedance Zcoil of an example instance of the electromechanical actuator 100 at different frequencies. In theory, the value of the DC coil resistance Re should be fixed and should not change with frequency, as shown by the line labeled ReDC in FIG. 4. However, through measurement of the imaginary and real portions of the coil impedance (shown as curves Zim and Zreal, respectively, in FIG. 4) at different high frequencies, it has been observed that the real portion Zreal shifts up in value as the frequency increases. Parasitic capacitances in the coil (shown as Zpar in FIG. 4) are hypothesized to account for the shift in Zreal, and skin effect may also contribute to the shift.

In an embodiment, the first step compensates for the Zreal shift with a fixed scaling factor. In an embodiment, for each sample of many samples of an electromechanical actuator, a high frequency estimate of ReDC was taken when the coil was heated up slightly. Also, for each sample, a low frequency estimate of ReDC was obtained by playing a pilot tone at very low frequency. A scaling factor was obtained as the difference between the high frequency and low frequency estimates. That is, the scaling factor is a predetermined value by which the high frequency estimate of Re is multiplied to obtain the low frequency estimate of Re. The application of the scaling factor to the value of Re determined by the estimator 301 of FIG. 3 may be referred to herein as high frequency compensation for low frequency estimation. As the estimation of the mechanical parameters of the electromechanical actuator according to the second piecewise step may be sensitive to the accuracy of the estimation of Re, the high frequency compensation for low frequency estimation may improve the accuracy of the estimation of the mechanical parameters.

Figure 5:
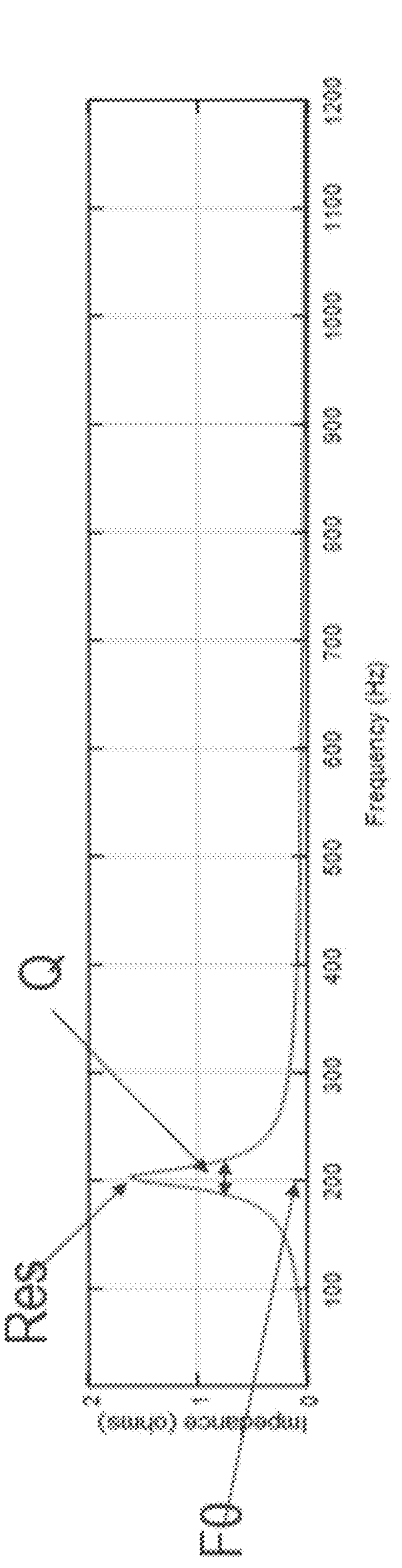
FIG. 5 is an example graph of the magnitude of the impedance of the tank of the electromechanical actuator as a function of frequency in accordance with embodiments of the present disclosure.

FIG. 5 is an example graph of the magnitude of the impedance, Zmech, of the tank of the electromechanical actuator as a function of frequency in accordance with embodiments of the present disclosure. As shown in FIG. 5, the center frequency at which the tank impedance is a maximum is the resonant frequency, F0, of the tank, Res is the peak impedance value, and the bandwidth around the peak is related to the quality factor, Q. In the example of FIG. 5, F0 is approximately 200 Hz, Q is approximately 8, and Res is approximately 1.6 Ohms, although different electromechanical actuators may have different values of Res, F0 and Q. The LF broadband excitation signal, examples of which are shown in FIG. 6, is designed to have a band broad enough to cover the tank impedance peak to enable estimation of the mechanical parameters of the tank.

Figure 6:
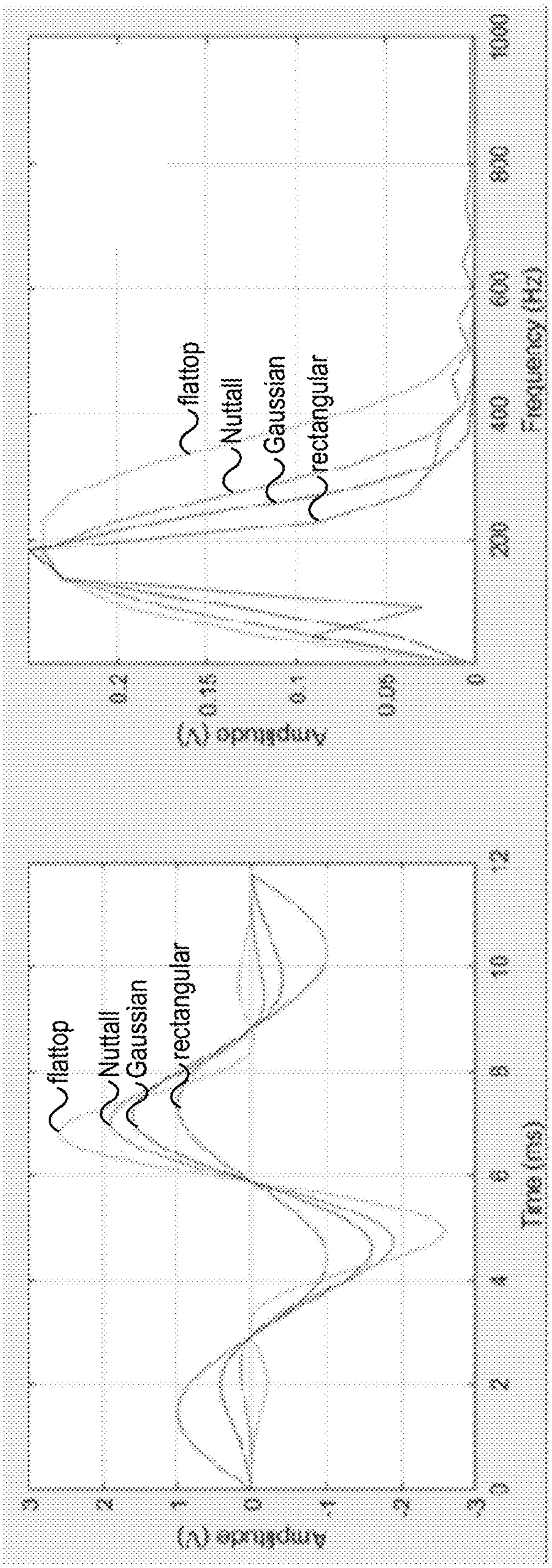
FIG. 6 is example respective time and frequency domain graphs of example LF broadband excitation signals employed in the second step of the piecewise electromechanical actuator characterization process in accordance with embodiments of the present disclosure.

FIG. 6 includes respective time and frequency domain graphs of example LF broadband excitation signals employed in the second step of the piecewise electromechanical actuator characterization process in accordance with embodiments of the present disclosure. In the example embodiment of FIG. 6, the LF broadband excitation signal comprises two cycles of a sinusoidal waveform multiplied by a window. An integer number of cycles is used in the LF broadband excitation signal in order to avoid introducing any DC or HF content into the excitation waveform. Although two cycles of the sinusoidal waveform are shown in FIG. 6, other integer numbers of cycles may be employed. The window has a smoothing effect by gradually tapering data values to zero at the ends of the sinusoidal waveform, as may be observed in FIG. 6 (and in the example of FIG. 8). Examples of types of windows are shown in FIG. 6 and may include, but are not limited to, a rectangular window, a Nuttall window, a flattop window, and a Gaussian window. In an embodiment, the Nuttall window provides a smooth waveform with a sufficiently wide band, as may be observed from the frequency domain graph of FIG. 6. The transient turn-on and turn-off of the LF broadband excitation signal provides the broad enough band to cover the tank impedance peak to enable estimation of the mechanical parameters of the tank.

Figure 7:
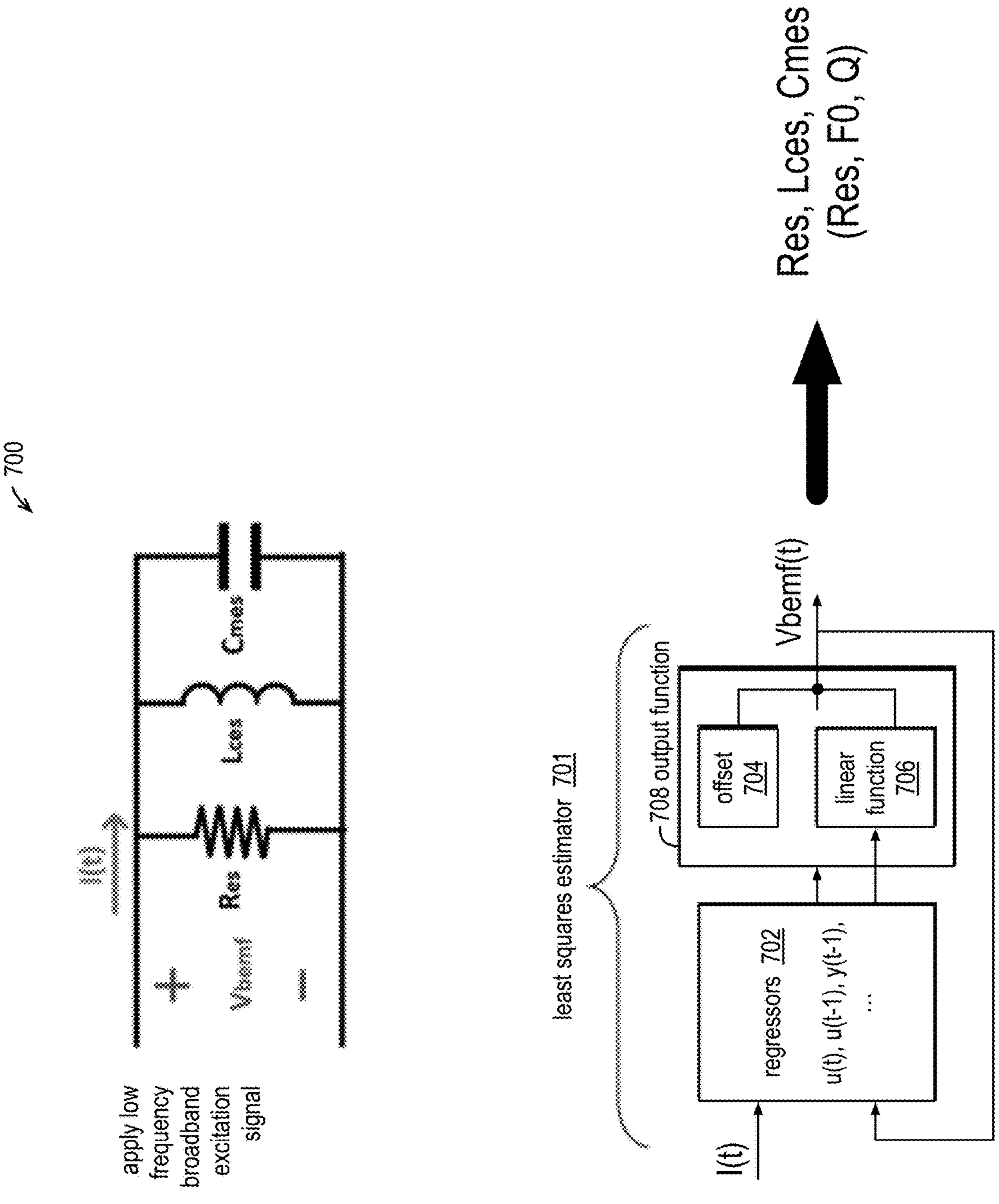
FIG. 7 is an example diagram illustrating the second step of the piecewise electromechanical actuator characterization process in accordance with embodiments of the present disclosure.

FIG. 7 is an example diagram illustrating the second step of the piecewise electromechanical actuator characterization process in accordance with embodiments of the present disclosure. FIG. 7 includes an estimator 701 and a circuit diagram 700 illustrating the application of the LF broadband excitation signal, e.g., as described with respect to FIG. 6, to the tank of the electromechanical actuator 100 of FIG. 1 to elicit a response in the form of current I(t) and back emf voltage Vbemf. As described above with respect to FIG. 6, the LF broadband excitation signal is designed to excite a band around the resonant frequency of the tank, i.e., around F0, and that is broad enough to cover the resonance peak, e.g., shown in FIG. 5. The response current I(t) is measured and, along with Re and Le estimated from the first step, used to calculate the back emf voltage Vbemf(t) according to equation (5) above. The measured current I(t) and calculated Vbemf(t) are then used by the estimator 701 to estimate the mechanical parameters of the tank of the electromechanical actuator, Res, Lces, and Cmes (or alternatively, Res, F0, and Q).

The least squares estimator 701 includes regressors 702 and an output function 708 that outputs the back emf voltage Vbemf(t). The output function 708 includes an offset 704 (e.g., of a current monitor as described above that requires mitigation in order to estimate Res, Lces, and Cmes more accurately) and a linear function block 706. The regressors 702 receive the current I(t) and the fed back emf voltage Vbemf(t) as inputs. The output of the regressors 702 is provided as an input to the linear function block 706. The offset 704 is subtracted from the output of the linear function block 706 to produce the back emf voltage Vbemf(t). In an embodiment, the estimator 701 uses least squares estimation to estimate Res, Lces, and Cmes using the back emf voltage Vbemf(t) and current I(t) according to equation (6) above using collected data samples, although other estimation methods may be employed as described above with respect to FIG. 3.

Figure 8:
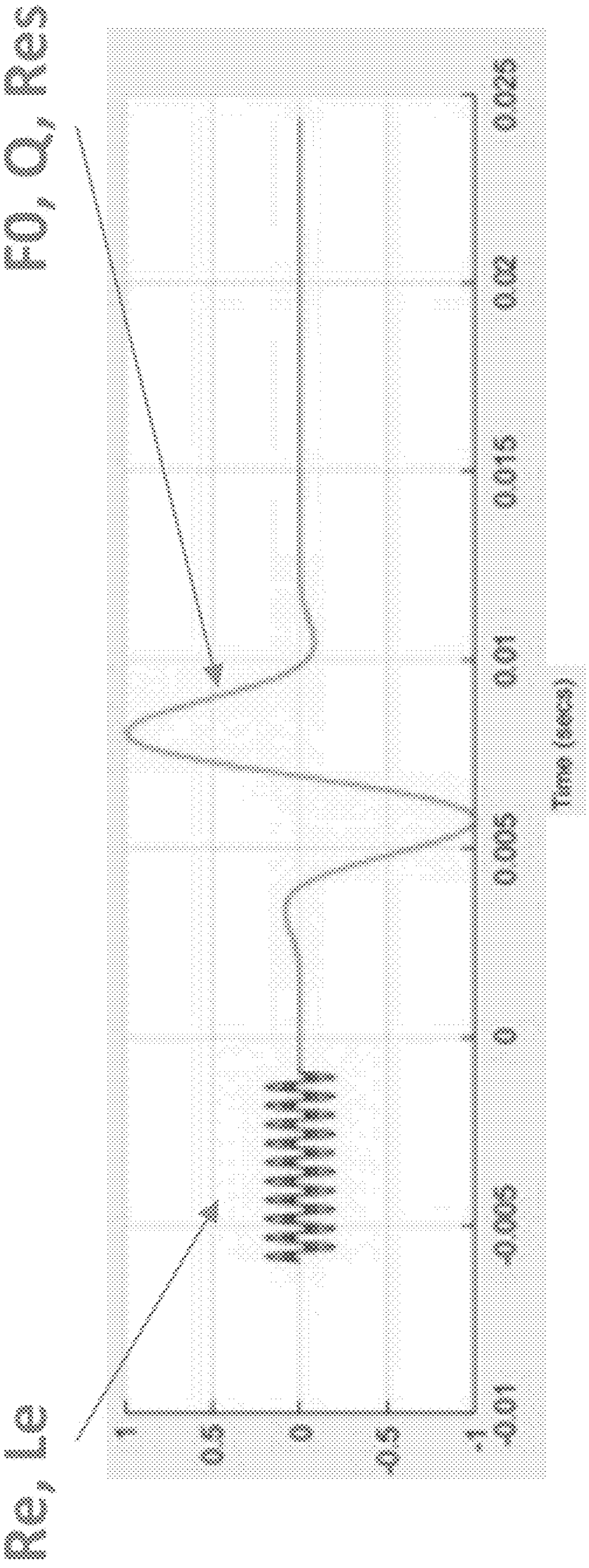
FIG. 8 is an example graph of a HF tone and LF broadband excitation signal employed in the piecewise electromechanical actuator characterization process in accordance with embodiments of the present disclosure.

FIG. 8 includes an example graph of a HF tone and LF broadband excitation signal employed in the piecewise electromechanical actuator characterization process in accordance with embodiments of the present disclosure. In the example embodiment of FIG. 8, the HF tone portion of the excitation signal comprises ten cycles of a 2 kHz sinusoidal pilot tone waveform having a burst duration of approximately five milliseconds designed to excite the coil for use in estimating Re and Le as described above, and the LF broadband portion of the excitation signal comprises two cycles of a 200 Hz sinusoidal waveform multiplied by a Nuttall window designed to excite the tank for use in estimating Res, F0, and Q (or alternatively, Res, Lces, and Cmes) as described above.

In the example of FIG. 8, the playback of the HF excitation signal is performed first in time and the playback of the LF broadband excitation signal is performed second in time. However, in other embodiments the playback of the LF broadband excitation signal is performed first in time and the playback of the HF excitation signal is performed second in time. Although, in both embodiments, the electrical parameters (Re, Le) are estimated first and then used to estimate the mechanical parameters (Res, Lces, Cmes or Res, F0, and Q). Furthermore, in other embodiments the playback of the HF excitation signal and the playback of the LF broadband excitation signal are performed concurrently, as long as the HF excitation signal and the LF broadband excitation signal do not produce harmonics that interfere with each other.

In the example of FIG. 8, the peak amplitude of the HF excitation signal is approximately 0.2 Volts. However, other embodiments are contemplated in which the peak amplitude of the HF excitation signal is other values. Furthermore, the HF excitation signal may be reduced in amplitude (e.g., to reduce or avoid disruption to the user) if more cycles are played such that a similar amount of energy is applied to excite the electromechanical actuator. In the example of FIG. 8, the peak amplitude of the LF broadband excitation signal is approximately one Volt, however embodiments with other peak amplitudes are contemplated. Furthermore, the LF broadband excitation signal may be reduced in amplitude if multiple broad band cycles are played, thereby enhancing signal-to-noise ratio (SNR). Still further, the playback of the HF excitation signal and/or the LF broadband excitation signal and measurement of the responses to them may be repeated multiple times to improve SNR.

In the example of FIG. 8, the HF excitation signal is a 2 kHz sinusoidal tone. However, other embodiments are contemplated in which a different high frequency than 2 kHz is employed. For example, the HF excitation signal may be substantially higher than the resonant frequency of the electromechanical actuator, e.g., sufficiently high to avoid overlap in frequency responses of the electromechanical actuator to the respective HF and LF broadband excitation signals. Stated alternatively, given the electrical (coil) and mechanical (tank) makeup of the electromechanical actuator, the frequency of the HF excitation tone may be sufficiently high to avoid interference with the response of the coil to the HF excitation signal from the mechanical resonance of the electromechanical actuator. In other words, the HF excitation signal may be outside the band of the resonant frequency of the electromechanical actuator, such as the band of the resonant frequency shown in FIG. 5 for example. In an embodiment, the HF excitation signal tone frequency may be within a range of frequencies that is centered at approximately five to ten times the mechanical resonant frequency of the electromechanical actuator to create a significant gap in frequency between the HF excitation signal and the LF broadband excitation signal.

In the example of FIG. 8, the LF broadband excitation signal comprises 2 cycles of a 200 Hz sinusoidal waveform multiplied by a Nuttall window. Although the resonant frequency F0 may be one of the parameters of the electromechanical actuator that is being determined by the embodiments described, a range of possibilities of the resonant frequency may be experimentally predetermined by testing a sample of instances of the electromechanical actuator and used to design the LF broadband excitation signal. The range of possible resonant frequencies may then be used to select a frequency for the sinusoidal waveform (that is multiplied by the window) of the LF broadband excitation signal that is centered within the range, and the window may be selected to spectrally cover the band of the range of resonant frequencies. In other words, the predetermined range may be understood as an a priori guess at the resonant frequency that is estimated more accurately using the parameter estimation embodiments of the present disclosure. Thus, although the frequency of the sinusoidal waveform of the example of FIG. 8 is 200 Hz, other frequencies may be chosen based on the predetermined resonant frequency range of possibilities. Furthermore, as described above, the sinusoidal waveform may be multiplied by other types of windows.

In an embodiment, the HF excitation signal and/or the LF broadband excitation signal may be applied to the electromechanical actuator and its responses thereto measured multiple times in order to improve the SNR. Furthermore, during the multiple times the LF broadband excitation signal is applied, one or more of the parameters of the LF broadband excitation signal may be adjusted, such as the frequency of the sinusoidal waveform, the amplitude of the sinusoidal waveform, the integer number of cycles of the sinusoidal waveform, and the type of the window by which the sinusoidal waveform is multiplied.

Given that the signal processing computation time may be small relative to the excitation and measurement times, it may be observed that only on the order of tens of milliseconds may be required to characterize the electromechanical actuator in the piecewise manner described, which may be a significant time reduction over previous methods, resulting in the advantages described herein. The characterization time may vary depending on various factors such as the resonant frequency of the electromechanical actuator, the number of samples in each of the HF and LF excitation signal components, and the number of times the excitation signals are applied and the responses are measured.

Still further, embodiments of the present disclosure may enjoy the benefit of lower power consumption relative to conventional methods such as the chirp method described above. Conventional methods that employ a chirp stimulus may consume a relatively large amount of power because of the long duration required to sweep through the frequency range to effect a response from both the coil and the tank. In contrast, the embodiments of the present disclosure break the stimulus up into two parts separated by a gap—a HF and a LF component directed specifically at the coil and the tank, respectively—that each can be a relatively narrow band (indeed, the HF stimulus can be a tone) and each can be a small number of cycles and thus consume a small amount of power relative to the conventional chirp stimulus methods. For similar reasons the embodiments of the present disclosure may consume less power than conventional impulse methods because of the relatively large amplitude of the impulse that is required.

It should be understood—especially by those having ordinary skill in the art with the benefit of this disclosure—that the various operations described herein, particularly in connection with the figures, may be implemented by other circuitry or other hardware components. The order in which each operation of a given method is performed may be changed, unless otherwise indicated, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure refers to specific embodiments, certain modifications and changes can be made to those embodiments without departing from the scope and coverage of this disclosure. Moreover, any benefits, advantages, or solutions to problems that are described herein with regard to specific embodiments are not intended to be construed as a critical, required, or essential feature or element.

Further embodiments, likewise, with the benefit of this disclosure, will be apparent to those having ordinary skill in the art, and such embodiments should be deemed as being encompassed herein. All examples and conditional language recited herein are intended for pedagogical objects to aid the reader in understanding the disclosure and the concepts contributed by the inventor to furthering the art and are construed as being without limitation to such specifically recited examples and conditions.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Finally, software can cause or configure the function, fabrication and/or description of the apparatus and methods described herein. This can be accomplished using general programming languages (e.g., C, C++), hardware description languages (HDL) including Verilog HDL, VHDL, and so on, or other available programs. Such software can be disposed in any known non-transitory computer-readable medium, such as magnetic tape, semiconductor, magnetic disk, or optical disc (e.g., CD-ROM, DVD-ROM, etc.), a network, wire line or another communications medium, having instructions stored thereon that are capable of causing or configuring the apparatus and methods described herein.

To aid the Patent Office and any readers of this application and any patent issued on this application in interpreting the claims appended hereto, applicants wish to indicate they do not intend any of the appended claims or claim elements to invoke 35 U.S.C. § 112(f) unless the words "means for" or "step for" are explicitly used in the particular claim. Furthermore, use of the term "configured to" is not intended to invoke 35 U.S.C. § 112(f).

The invention claimed is:

1. A method, comprising:

applying a high frequency signal to an electromechanical actuator and measuring a first response of the electromechanical actuator to the high frequency signal;

estimating electrical parameters of the electromechanical actuator based on the first response;

applying a low frequency broadband signal to the electromechanical actuator and measuring a second response of the electromechanical actuator to the low frequency broadband signal; and estimating mechanical parameters of the electromechanical actuator based on the second response and the estimated electrical parameters.

2. The method of claim 1, wherein said applying the high frequency signal and said applying the low frequency broadband signal are performed concurrently.

3. The method of claim 2, wherein the high frequency signal and the low frequency broadband signal are selected such that they do not produce harmonics that interfere with each other.

4. The method of claim 1, wherein said applying the high frequency signal is performed prior to said applying the low frequency broadband signal.

5. The method of claim 1, wherein said applying the high frequency signal is performed after said applying the low frequency broadband signal.

6. The method of claim 1, further comprising:

said estimating the electrical parameters and the mechanical parameters of the electromechanical actuator during calibration of the electromechanical actuator during manufacture of a device that includes the electromechanical actuator.

7. The method of claim 1, further comprising:

said estimating the electrical parameters and the mechanical parameters of the electromechanical actuator during operation by a consumer of a device that includes the electromechanical actuator.

8. The method of claim 1, wherein the electrical parameters and the mechanical parameters are obtained in less than 50 milliseconds.

9. The method of claim 1, wherein said applying the high frequency signal and measuring the first response and/or said applying the low frequency broadband signal and measuring the second response are repeated multiple times to improve signal-to-noise ratio.

10. The method of claim 1, wherein the low frequency broadband signal spectrally covers a frequency band centered around a range of a mechanical resonant frequency experimentally predetermined from a sample of instances of the electromechanical actuator.

11. The method of claim 1, wherein the low frequency broadband signal comprises a sinusoidal waveform multiplied by a window.

12. The method of claim 11, wherein said applying the low frequency broadband signal and measuring the second response is repeated multiple times; and wherein for each time of the multiple times, one or more of the following is adjusted:

a frequency of the sinusoidal waveform;

an amplitude of the sinusoidal waveform;

an integer number of cycles of the sinusoidal waveform; and a type of the window.

13. The method of claim 11, wherein the high frequency signal is sufficiently higher than a frequency of the sinusoidal waveform of the low frequency broadband signal to avoid overlap in respective frequency responses thereof.

14. The method of claim 1, wherein the high frequency signal is sufficiently high to avoid interference with the first response from a mechanical resonance of the electromechanical actuator.

15. The method of claim 14, wherein the high frequency signal is approximately an order of magnitude higher than a resonant frequency of the electromechanical actuator.

16. The method of claim 1, wherein the high frequency signal is outside a band of a resonant frequency of the electromechanical actuator.

17. The method of claim 1, wherein said estimating the mechanical parameters comprises:

calculating a back emf voltage using the estimated electrical parameters and the measured second response; and using the calculated back emf voltage and the measured second response to estimate the mechanical parameters.

18. The method of claim 1, wherein the electrical parameters comprises a direct current (DC) electrical resistance (Re); and wherein said estimating the electrical parameters comprises:

estimating Re based on the first response; and applying a predetermined scaling factor to the estimated Re to compensate for shift of a real component of an impedance of a coil portion of the electromechanical actuator at high frequency.

19. The method of claim 1, wherein said estimating the electrical parameters comprises compensating for an offset of a circuit used to measure the first response.

20. The method of claim 1, wherein the electrical parameters comprise a direct current (DC) electrical resistance (Re) and an electrical coil inductance (Le) of the electromechanical actuator; and wherein the mechanical parameters comprise a resistance at resonance (Res), resonant frequency (F0), and quality factor (Q) of the electromechanical actuator, or equivalents thereof.

21. The method of claim 1, wherein said applying the high frequency signal and said applying the low frequency broadband signal takes less than 25 milliseconds total.

22. The method of claim 1, wherein the electromechanical actuator comprises a haptic transducer of a vibro-haptic system.

23. A non-transitory computer-readable storage medium having computer program instructions stored thereon to implement a method comprising:

applying a high frequency signal to an electromechanical actuator and measuring a first response of the electromechanical actuator to the high frequency signal;

estimating electrical parameters of the electromechanical actuator based on the first response;

applying a low frequency broadband signal to the electromechanical actuator and measuring a second response of the electromechanical actuator to the low frequency broadband signal; and estimating mechanical parameters of the electromechanical actuator based on the second response and the estimated electrical parameters.

24. The non-transitory computer-readable storage medium having computer program instructions stored thereon to implement the method of claim 23, wherein said applying the high frequency signal and said applying the low frequency broadband signal are performed concurrently.

25. The non-transitory computer-readable storage medium having computer program instructions stored thereon to implement the method of claim 24, wherein the high frequency signal and the low frequency broadband signal are selected such that they do not produce harmonics that interfere with each other.

26. The non-transitory computer-readable storage medium having computer program instructions stored thereon to implement the method of claim 23, wherein said applying the high frequency signal is performed prior to said applying the low frequency broadband signal.

27. The non-transitory computer-readable storage medium having computer program instructions stored thereon to implement the method of claim 23, wherein said applying the high frequency signal is performed after said applying the low frequency broadband signal.

28. The non-transitory computer-readable storage medium having computer program instructions stored thereon to implement the method of claim 23, further comprising:

said estimating the electrical parameters and the mechanical parameters of the electromechanical actuator during calibration of the electromechanical actuator during manufacture of a device that includes the electromechanical actuator.

29. The non-transitory computer-readable storage medium having computer program instructions stored thereon to implement the method of claim 23, further comprising:

said estimating the electrical parameters and the mechanical parameters of the electromechanical actuator during operation by a consumer of a device that includes the electromechanical actuator.

30. The non-transitory computer-readable storage medium having computer program instructions stored thereon to implement the method of claim 23, wherein the electrical parameters and the mechanical parameters are obtained in less than 50 milliseconds.

31. The non-transitory computer-readable storage medium having computer program instructions stored thereon to implement the method of claim 23, wherein said applying the high frequency signal and measuring the first response and/or said applying the low frequency broadband signal and measuring the second response are repeated multiple times to improve signal-to-noise ratio.

32. The non-transitory computer-readable storage medium having computer program instructions stored thereon to implement the method of claim 23, wherein the low frequency broadband signal spectrally covers a frequency band centered around a range of a mechanical resonant frequency experimentally predetermined from a sample of instances of the electromechanical actuator.

33. The non-transitory computer-readable storage medium having computer program instructions stored thereon to implement the method of claim 23, wherein the low frequency broadband signal comprises a sinusoidal waveform multiplied by a window.

34. The non-transitory computer-readable storage medium having computer program instructions stored thereon to implement the method of claim 33, wherein said applying the low frequency broadband signal and measuring the second response is repeated multiple times; and wherein for each time of the multiple times, one or more of the following is adjusted:

a frequency of the sinusoidal waveform;

an amplitude of the sinusoidal waveform;

an integer number of cycles of the sinusoidal waveform; and a type of the window.

35. The non-transitory computer-readable storage medium having computer program instructions stored thereon to implement the method of claim 33, wherein the high frequency signal is sufficiently higher than a frequency of the sinusoidal waveform of the low frequency broadband signal to avoid overlap in respective frequency responses thereof.

36. The non-transitory computer-readable storage medium having computer program instructions stored thereon to implement the method of claim 23, wherein the high frequency signal is sufficiently high to avoid interference with the first response from a mechanical resonance of the electromechanical actuator.

37. The non-transitory computer-readable storage medium having computer program instructions stored thereon to implement the method of claim 36, wherein the high frequency signal is approximately an order of magnitude higher than a resonant frequency of the electromechanical actuator.

38. The non-transitory computer-readable storage medium having computer program instructions stored thereon to implement the method of claim 23, wherein the high frequency signal is outside a band of a resonant frequency of the electromechanical actuator.

39. The non-transitory computer-readable storage medium having computer program instructions stored thereon to implement the method of claim 23, wherein said estimating the mechanical parameters comprises:

calculating a back emf voltage using the estimated electrical parameters and the measured second response; and using the calculated back emf voltage and the measured second response to estimate the mechanical parameters.

40. The non-transitory computer-readable storage medium having computer program instructions stored thereon to implement the method of claim 23, wherein the electrical parameters comprises a direct current (DC) electrical resistance (Re); and wherein said estimating the electrical parameters comprises:

estimating Re based on the first response; and applying a predetermined scaling factor to the estimated Re to compensate for shift of a real component of an impedance of a coil portion of the electromechanical actuator at high frequency.

41. The non-transitory computer-readable storage medium having computer program instructions stored thereon to implement the method of claim 23, wherein said estimating the electrical parameters comprises compensating for an offset of a circuit used to measure the first response.

42. The non-transitory computer-readable storage medium having computer program instructions stored thereon to implement the method of claim 23, wherein the electrical parameters comprise a direct current (DC) electrical resistance (Re) and an electrical coil inductance (Le) of the electromechanical actuator; and wherein the mechanical parameters comprise a resistance at resonance (Res), resonant frequency (F0), and quality factor (Q) of the electromechanical actuator, or equivalents thereof.

43. The non-transitory computer-readable storage medium having computer program instructions stored thereon to implement the method of claim 23, wherein said applying the high frequency signal and said applying the low frequency broadband signal takes less than 25 milliseconds total.

44. The non-transitory computer-readable storage medium having computer program instructions stored thereon to implement the method of claim 23, wherein the electromechanical actuator comprises a haptic transducer of a vibro-haptic system.

* * * * *